Patented July 17, 1928.

UNITED STATES PATENT OFFICE.

FRITZ STRAUB, OF BASEL, HERMANN SCHNEIDER, OF RIEHEN, NEAR BASEL, AND JOSEPH SPIELER, OF BASEL, SWITZERLAND, ASSIGNORS TO SOCIETY OF CHEMICAL INDUSTRY IN BASLE, OF BASEL, SWITZERLAND.

METAL COMPOUND OF AZO DYESTUFF AND PROCESS OF MAKING SAME.

No Drawing. Application filed April 7, 1925, Serial No. 21,440, and in Switzerland April 20, 1924.

This invention relates to new dyestuffs valuable for the production of fast tints on the fibre. It comprises the new dyestuffs and the process of making same, as well as the material dyed with the new dyestuffs.

It has been found that new dyestuffs are obtained by combining hydroxynaphthalene monosulfamides, in which the hydroxy and the sulfamido group are not in peri-position, with ortho-hydroxy-diazo-compounds, and treating the dyestuffs thus obtained, which correspond with the general formula:

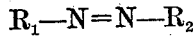

wherein $R_1$ stands for a hydroxynaphthalene-monosulfamide nucleus having its OH and its $SO_2NH_2$ group in any other than the peri-position, and in which the OH-group itself is in ortho-position to the azo bridge, $R_2$ meaning an aromatic nucleus carrying a hydroxy group in ortho-position to the azo bridge, with agents yielding metal such as copper or chromium compounds. The azo dyestuffs form dark powders, dissolving in dilute acetic acid with red to bordeaux-red and blue coloration, in dilute caustic soda solution with orange to red-violet, in dilute sodium carbonate solution with violet to cyaneous, in concentrated sulfuric acid with red-violet to blue coloration. They yield on wool, when after-coppered, red-violet to blue-violet, when after-chromed, violet to blue and black-green fast tints. The corresponding metal compounds form also dark powders, dissolving in water with red-violet to blue colorations and yielding on wool, when dyed in an acid bath, fast red-violet to blue and dark green tints.

Example 1.

22.3 parts of 1-hydroxynaphthalene-5-sulfamide (light brownish crystals when crystallized from dilute acetic acid, melting at 263° C.) are introduced into a solution of 56 parts of caustic potash in 48 parts of water at 20-25° C. A semi-fluid suspension is formed, which is treated at the same temperature with 25 parts of the sodium compound of diazotized 1-amino-2-hydroxynaphthalene-4-sulfonic acid added in one dose. The mixture is stirred until all of the diazo compound has disappeared, whereafter 150 parts of water are added. The whole is then poured into 280 parts of hydrochloric acid of 15 per cent strength and the dyestuff precipitated by addition of common salt.

The new dyestuff corresponding with the formula:

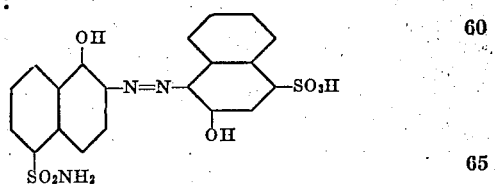

forms a blackish-brown powder, dissolving in dilute acetic acid with bordeaux, in dilute caustic soda solution with cyaneous, in concentrated sulfuric acid with blue coloration. It yields on wool, when dyed in an acetic acid bath, dull violet tints becoming blue when after-chromed, violet and fast when after-coppered. The analogous dyestuff from the nitrated diazo compound of the 1-amino-2-hydroxynaphthalene-4-sulfonic acid yields on wool, when after-chromed, black-green tints.

Analogous dyestuffs are obtained by coupling the same diazo compound with 1-hydroxynaphthalene-4-sulfamide or 2-hydroxynaphthalene-6-sulfamide.

The 1-hydroxynaphthalene-4-sulfamide which has not hitherto been described forms, when recrystallized from acetic acid, light brownish crystals melting at 223° C.

Example 2.

18.9 parts of 1-hydroxy-2-aminobenzene-4-sulfonic acid are diazotized as usual and introduced into a solution containing 22.3 parts of 1-hydroxynaphthalene-5-sulfamide, 8 parts of caustic soda, 20 parts of sodium carbonate, and 250 parts of water. The mixture is stirred at ordinary temperature until the diazo compound has disappeared. The dyestuff is then precipitated by addition of common salt and filtered. It forms a blackish-brown powder, dissolving in dilute acetic acid with red, in dilute caustic soda solution with orange, in sodium carbonate solution with violet, in concentrated sulfuric acid with bluish-red coloration. When dyed on wool in an acetic acid bath the dyestuff corresponding with the formula:

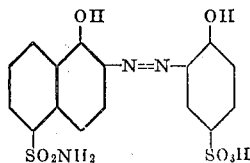

yields bluish-red tints, becoming red-violet and very fast when after-chromed, bluish-red when after-coppered.

Analogous tints with good properties of fastness are obtained by use of the dyestuffs from the same diazo-component and 1-hydroxynaphthalene-4-sulfamide or 2-hydroxynaphthalene-6-sulfamide.

*Example 3.*

22.3 parts of 1-hydroxynaphthalene-5-sulfamide are introduced into a solution of 56 parts of caustic potash in 48 parts of water at 40–45° C. The mixture thus obtained is mixed with the diazo-compound from 31.8 parts of 1-hydroxynaphthalene-8-sulfamide-2-amino-4-sulphonic acid in the form of a paste of 49 per cent strength. When coupling is complete the mixture is diluted with 200 parts of cold water, 280 parts of hydrochloric acid of 15 per cent strength are run in while stirring and the new dyestuff corresponding with the formula:

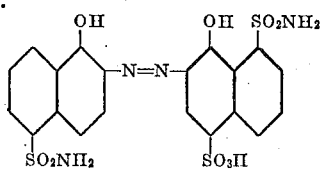

is salted out. It forms a brown powder, dissolving in dilute acetic acid with bluish-red, in dilute caustic soda with red-violet, in dilute sodium carbonate solution with cyaneous, in concentrated sulfuric acid with violet coloration. It yields on wool, when dyed in an acid bath, red-violet tints which become blue, but are partially decomposed when after-chromed, and violet when after-coppered. The isomeric dyestuff from 2-hydroxynaphthalene-6-sulfamide shows similar properties.

*Example 4.*

42.3 parts of the dyestuff from 1-hydroxy-2-aminobenzene-4-sulfonic acid and 1-hydroxynaphthalene-5-sulfamide are dissolved in 800 parts of boiling water. To the solution is added a solution of chromium formate corresponding with 16 parts of $Cr_2O_3$ and the whole is boiled for a long time in the reflux apparatus. By evaporating and salting out the new chromium compound is obtained. It forms a blackish powder, dissolving in water with red-violet, in dilute caustic soda with bluish-red coloration, dyeing wool in an acid bath violet tints of excellent fastness.

*Example 5.*

47.3 parts of the dyestuff from the diazo-compound of 1-amino-2-hydroxynaphthalene-4-sulphonic acid and 1-hydroxynaphthalene-5-sulfamide are dissolved in 800 parts of boiling water. There is added a chromium fluoride solution corresponding with 16 parts of $Cr_2O_3$ and the mixture is boiled with addition of glass powder for a long time in a reflux apparatus, after which the chromium compound is separated by concentrating and salting out. It forms a blackish-violet powder, dissolving in water with blackish-blue, in dilute caustic soda solution with red-violet coloration, dyeing wool in an acid bath pure fast blue tints. It it not known how the chromium is bound to the azodyestuff.

Analogous, also blue dyeing dyestuffs containing chromium are obtained from the dyestuffs obtained with 2-hydroxynaphthalene-6-sulfamide or 1-hydroxynaphthalene-5-sulfamide and 1-hydroxynaphthalene-2-amino-8-sulfamide-4-sulfonic acid.

*Example 6.*

55.2 parts of the dyestuff from 1-hydroxynaphthalene-5-sulfamide and the diazo-compound from 1-hydroxynaphthalene-8-sulfamide-2-amino-4-sulfonic acid are dissolved in 800 parts of hot water. There is added a concentrated solution of 27 parts of copper sulfate and the mixture is warmed for a short time. There are then added 15 parts of sodium acetate and the new dyestuff is salted out. It forms a dark powder dissolving in water and in dilute caustic soda solution with red-violet coloration, dyeing wool in an acid bath fast violet tints.

The ortho-hydroxy-azo-dyestuffs mentioned in the preceding examples form analogous copper derivatives dyeing wool red to bluish-violet tints.

What we claim is:

1. As a step in the manufacture of azo dyestuffs containing metals the herein described process for the manufacture of azo-dyestuffs, by coupling hydroxynaphthalene-monosulfamides other than the 1:8-hydroxynaphthalenesulfamide with ortho-hydroxy-diazo-compounds.

2. As a step in the manufacture of azo dyestuffs containing metals the herein described process for the manufacture of azo-dyestuffs, by coupling the 1:5-hydroxynaphthalenesulfamide with ortho-hydroxy-diazo-compounds.

3. The herein described process for the manufacture of metal compounds of azo-dyestuffs, by coupling hydroxynaphthalene-monosulfamides other than the 1:8-hydroxynaphthalenesulfamide with ortho-hydroxy-diazo-compounds, and treating the dyestuffs thus obtained with agents yielding chromium.

4. The herein described process for the manufacture of metal compounds of azo-dyestuffs, by coupling the 1:5-hydroxynaphthalenesulfamide with ortho-hydroxy-diazo-compounds and treating the dyestuffs thus obtained with agents yielding chromium.

5. As new products the herein described chromium compounds of the dyestuffs of the general formula $R_1-N=N-R_2$, wherein $R_1$ stands for a hydroxynaphthalene-monosulfamide nucleus having its OH and its $SO_2NH_2$ group in any other than the peri-position, and in which the OH-group itself is in ortho-position to the azo bridge, and $R_2$ meaning an aromatic nucleus carrying a hydroxy group in ortho-position to the azo bridge, which dyestuffs form dark powders, dissolving in water with red-violet to blackish-blue and in dilute caustic soda solution with red-violet to bluish-red coloration, dying wool in an acid bath fast violet to blue and greenish-black tints.

6. As new products the herein described chromium compounds of the dyestuffs of the general formula:

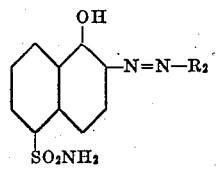

wherein $R_2$ stands for an aromatic nucleus carrying a hydroxy group in ortho-position to the azo bridge, which dyestuffs form dark powders, dissolving in water with red-violet to blackish-blue and in dilute caustic soda solution with red-violet to bluish-red coloration, dying wool in an acid bath fast violet to blue and greenish-black tints.

7. Material dyed with the dyestuffs of claim 5.

8. Material dyed with the dyestuffs of claim 6.

In witness whereof we have hereunto signed our names this 25th day of March, 1925.

FRITZ STRAUB.
HERMANN SCHNEIDER.
JOSEPH SPIELER.